(No Model.)

J. W. DAVIS.
DETACHABLE HANDLE FOR TEA CUPS, &c.

No. 256,983. Patented Apr. 25, 1882.

WITNESSES:
Theo. G. Hoskin
C. Sedgwick

INVENTOR:
J. W. Davis
BY Munn & Co.
ATTORNEYS.

UNITED STATES PATENT OFFICE.

JOHN W. DAVIS, OF MARION, SOUTH CAROLINA.

DETACHABLE HANDLE FOR TEA-CUPS, &c.

SPECIFICATION forming part of Letters Patent No. 256,983, dated April 25, 1882.

Application filed February 24, 1882. (No model.)

*To all whom it may concern:*

Be it known that I, JOHN W. DAVIS, of Marion, in the county of Marion and State of South Carolina, have invented a new and Improved Detachable Handle for Tea-Cups and Similar Vessels, of which the following is a full, clear, and exact description.

Reference is to be had to the accompanying drawings, forming part of this specification, in which similar letters of reference indicate corresponding parts in both the figures.

Figure 1:
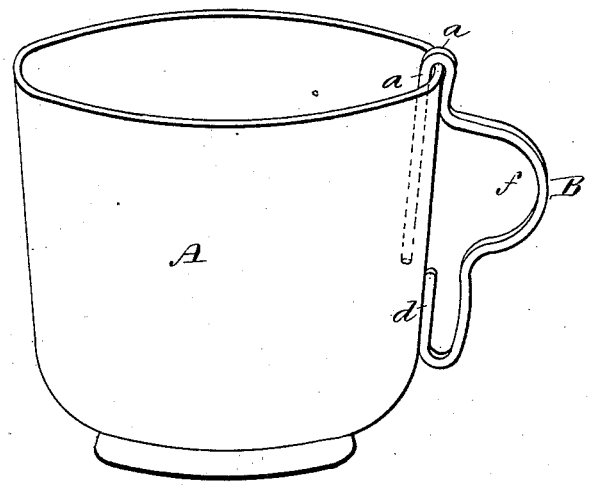
Figure 2:
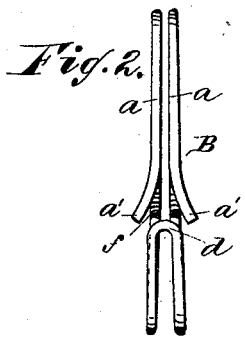

Figure 1 is a perspective view of a tea-cup having my new and improved handle attached thereto, and Fig. 2 is a front elevation of the handle removed from the cup.

A represents the tea-cup, and B represents the detachable handle.

Though the handle B may be made of a strip or narrow plate of spring metal, I prefer to make it of a single piece of steel or other spring-metal wire, which may be plated, if desired, with silver, gold, or nickel.

In making the handle the wire is by preference first folded, so that the handle will be in two strands, to give the handle sufficient width, when completed, to prevent all danger of the handle turning sidewise upon the cup or other vessel to which it may be attached. The two strands of wire are then bent to form the prongs $a$ $a$, which go over the edge and inside the cup or other vessel, and so as to form the fold $d$, which rests against the outside side of the cup or other vessel when the handle is in place. The strands of wire are then bent outward in the center away from the fold $d$ and prongs $a$ $a$, to form the curved grasp $f$, all as clearly indicated in Fig. 1. The prongs $a$ $a$ are bent outwardly away from each other at their ends, as indicated at $a'$ $a'$ in Fig. 2, so that the handle will take a firm grasp upon the cup and be held from turning or moving laterally on the cup. The prongs $a$ $a$ and the fold $d$ are formed in such relation to each other that when the handle is not placed upon the cup their outer faces will be on a plane with each other, so that when placed upon the cup or other vessel, the thickness of the vessel being passed between them will cause the prongs and fold to be forced away or deflected from each other, as indicated in Fig. 1, which deflection will bring into action the elasticity of the metal of the handle, which will cause the handle to be held with sufficient firmness upon the cup or other vessel for the safe handling of the vessel and its contents.

By this construction of the handle it will be seen that the handle is very cheap, ornamental, and durable, and can be easily removed from the cup or vessel, which is a great advantage in cleaning and putting the same away when not in use; and this handle gives to plain cups or similar vessels all the advantages of those that have permanent handles, and at less expense, and the handle is not liable to be broken off, as in the case of permanent handles, but may be used any length of time.

Having thus fully described my invention, I claim as new and desire to secure by Letters Patent—

As an article of manufacture, the removable handle for cups and similar vessels, made substantially as herein shown and described, consisting of the spring-metal handle B, bent to form the prongs $a$, the fold $d$, and the grasp $f$, as set forth.

JOHN WILLIAM DAVIS.

Witnesses:
 WM. MARCUS,
 L. R. OWENS.